United States Patent [19]

Cameron

[11] Patent Number: 5,653,405
[45] Date of Patent: Aug. 5, 1997

[54] BALLOON VENTING VALVES

[75] Inventor: Donald Allan Cameron, Bedminster, United Kingdom

[73] Assignee: Cameron Balloons Limited, Bristol, United Kingdom

[21] Appl. No.: 501,905

[22] Filed: Jul. 13, 1995

[30]     Foreign Application Priority Data

Jul. 14, 1994 [GB] United Kingdom ............... 9414232
Aug. 9, 1994 [GB] United Kingdom ............... 9416089

[51] Int. Cl.$^6$ .............................................. B64B 1/62
[52] U.S. Cl. .......................................... 244/99; 244/96
[58] Field of Search ............................ 244/31, 96, 97, 244/98, 99, 145, 152; 251/228, 298; 160/345

[56]           References Cited

U.S. PATENT DOCUMENTS

| 2,771,256 | 11/1956 | Ryan .................................. 244/31 |
| 4,033,527 | 7/1977 | Parsons ............................... 244/99 |
| 4,402,476 | 9/1983 | Wiederkehr . |
| 4,651,956 | 3/1987 | Winker et al. . |
| 4,836,471 | 6/1989 | Piccard ............................... 244/99 |

FOREIGN PATENT DOCUMENTS

| 2253664 | 7/1975 | France . |
| 7343644 | 7/1975 | France ............................... 244/99 |
| 145269 | 7/1920 | United Kingdom ............. 244/31 |
| 2260956 | 5/1993 | United Kingdom . |

Primary Examiner—Andres Kashnikow
Assistant Examiner—Tien Dinh
Attorney, Agent, or Firm—Marshall, O'Toole, Gerstein, Murray & Borun

[57]                ABSTRACT

A venting valve in a hot air balloon comprises a valve member for opening and closing on outlet hole in the balloon envelope, the valve member being in the form of a flat panel having an edge portion secured along a line to a portion of the envelope adjacent an edge portion of the outlet hole. There is a cord and pulley arrangement for drawing the valve member to and fro across the outlet hole, moving substantially transversely of the outlet hole, to close and open the outlet hole. The cord and pulley arrangement can be operated both to open and to close the valve, closing movement being possible from any partially or fully open position of the valve, and, in one form, also, from the valve member fully closed position, to obtain re-closable venting without moving the valve member transversely of the outlet hole.

6 Claims, 2 Drawing Sheets

BALLOON VENTING VALVES

This invention relates to balloon venting valves.

Hot air balloons are provided with venting valves for venting the interior of the balloon to the exterior to permit a controlled escape of hot air from the balloon when desired by the pilot.

One well known form of balloon venting valve is the parachute valve. In the top of the envelope of the balloon there is a circular outlet hole traversed by tapes which are secured to the envelope. With the balloon inflated the outlet valve is normally closed by a valve member in the form of a circular piece of fabric of larger diameter than the outlet hole. Shroud lines descend from around the perimeter of the valve member to a central point so that the valve member and its shroud resemble a parachute, the valve member being held centrally with respect to the outlet hole by centralizing lines attached to its periphery and to the envelope. Hot air within the inflated balloon acts to hold the valve member at the top of the envelope, closing the outlet hole. By pulling a control line attached to the shroud lines at the central point, the pilot can pull the valve member down partially or completely away from the outlet hole, the hot air thereby allowed to escape acting in the sense to close the valve again upon release of the control line. In this form of valve, the significant number of centralizing lines and shroud lines gives a complex structure that has a restricting effect on operation of the valve member. It is particularly difficult to achieve an arrangement that will permit sufficiently wide opening of the valve to obtain rapid balloon deflation, required, for example, when landing.

In GB 2 260 956 A there is described a parachute valve provided with locking means securing the valve member to the envelope to limit valve member opening movement and releasable to free the valve member for further opening movement sufficient to allow rapid deflation but once the locking means is released the valve member cannot be returned to its outlet hole closing position. Accordingly, the locking means must only be released to obtain rapid deflation at the conclusion of a flight. The locking means cannot be utilized to achieve rapid deflation followed by re-inflation.

According to the present invention there is provided a venting valve in a hot air balloon comprising a valve member for opening and closing an outlet hole in the balloon envelope, the valve member being in the form of a flat panel having an edge portion secured along a line to a portion of the envelope adjacent an edge portion of the outlet hole, and a cord and pulley arrangement for drawing the valve member to and fro across the outlet hole, moving substantially transversely of the outlet hole, to close and open the outlet hole.

In a particular form the outlet hole is of triangular configuration and the valve member is of a larger triangular configuration for overlapping the outlet hole, the valve member having one of its side edges secured to the balloon envelope along one side of the outlet hole. Two cords of the cord and pulley arrangement run, close together, from an anchorage at the balloon envelope through a pulley system comprising a pulley attached to the free apex of the valve member, a pulley attached to the balloon envelope and a pulley having a first pilot-operable cord of the cord and pulley arrangement attached to it, from whence the two cords separate and pass to respective attachment points one at each free side of the valve member. In another form the outlet hole and valve member are as just described and a first pilot-operable cord of the cord and pulley arrangement runs from the free apex of the valve member to a pulley attached to the balloon envelope and, as particularly described hereinafter, from this pulley back to another pulley that is attached to the valve member between the free apex thereof and the attachment point thereon of a second pilot-operable cord. In both these forms, a second pilot-operable cord of the cord and pulley arrangement runs from an attachment point on the valve member that is between the secured side edge and the free apex of the valve member to a further pulley attached to the balloon envelope and on for pilot operation.

Each of the venting valves as just described can be operated by a pilot appropriately pulling on the first and second cords of the cord and pulley arrangement to close the outlet hole, partially open the outlet hole or totally open the outlet hole, and can be returned to the outlet hole fully closed position from any outlet hole partially or fully open position.

In both forms at least primary opening and closing movement of the valve member, brought about by appropriately pulling on the first and second cords, is achieved with the valve member moving substantially transversely of the outlet hole. In addition, in the form in which there are two cords attached to the valve member side edges, with the valve member in closed position if the first pilot-operable cord is pulled with some force these two cords pull down the valve member side edges to give venting without moving the valve member transversely of the outlet hole, the valve member reclosing under the action of air in the balloon when the second cord is released.

In both forms reinflation after rapid deflation is possible and this is achieved with a valve member and operating cord and pulley arrangement that is of simple structure.

For a better understanding of the invention and to show how the same may be carried into effect, reference will now be made, by way of example, to the accompanying drawings, in which.

Figure 1:
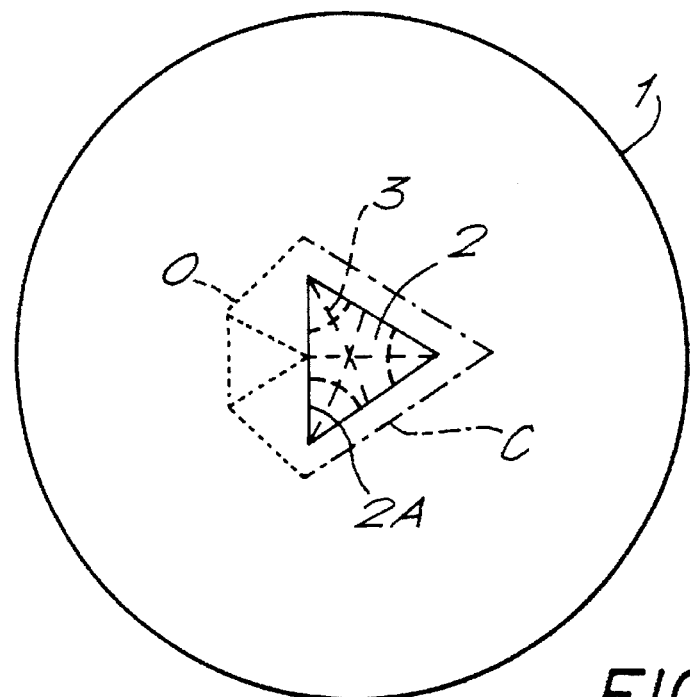
FIG. 1 is a schematic view from above of a hot air balloon.
Figure 2:
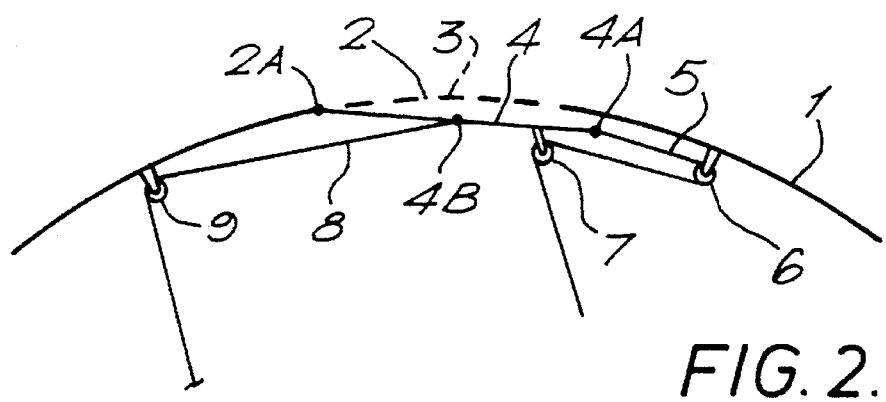
FIG. 2 is a schematic view of the upper part of the interior of the balloon with a venting valve shown in closed position.
Figure 3:
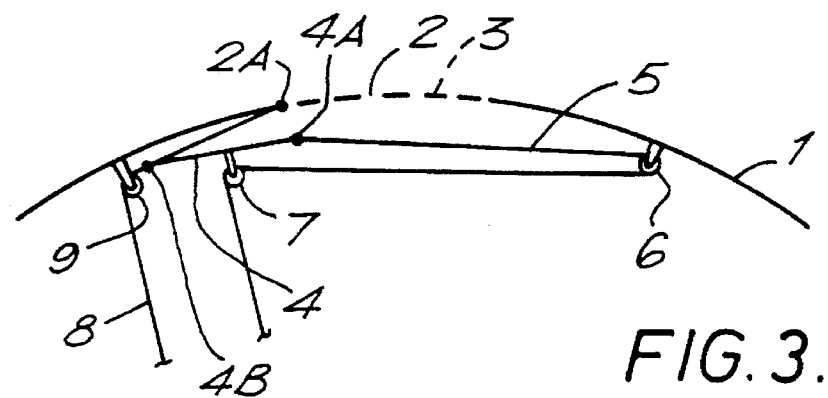
FIG. 3 is a view as FIG. 2 but showing the venting valve fully open to give rapid deflation of the balloon.

Referring first to FIGS. 1 to 3, in the top of the envelope 1 of the balloon there is an outlet hole 2 which in the form illustrated is of triangular configuration. The hole 2 is traversed by tapes 3 which are secured to the envelope 1. With the balloon inflated, the hole 2 is normally closed by a valve member 4 that is a flat panel of triangular configuration larger than the hole 2 so that the valve member 4 entirely overlaps the hole 2. Along one edge 2A of the hole 2 the valve member 4 is permanently secured to the envelope 1 by a line of stitching.

At its free apex 4A the valve member 4 has attached to it a first pilot operable cord 5 of a cord and pulley arrangement for operating the venting valve constituted by the valve member 4 and the outlet hole 2. From the free apex 4A the cord 5 passes around a first pulley 6 carried by the envelope 1, back and around a second pulley 7 carried by the valve member 4 near to its free apex 4A and down for pilot operation.

A second pilot-operable cord 8 of the cord and pulley arrangement runs from an attachment point 4B on the valve member 4 that is between the edge secured at 2A and the attachment point 4A for the second pulley 7, around a third pulley 9 carried by the envelope 1 and down for pilot operation.

When the valve member 4 is fully closing the outlet hole 2 (as shown in chain dot lines C in FIG. 1 and in full lines in FIG. 2) it is prevented from blowing out of the outlet hole 2 by the tapes 3. From this position the pilot can open the venting valve by pulling on the second cord 8. When this cord is pulled the valve member 4 is folded inwards on itself so that it moves substantially transversely of the outlet hole 2. The pilot can open the valve to any desired extent, including the position shown in dotted lines O in FIG. 1 and in full lines in FIG. 3 in which the outlet hole 2 is fully open for rapid deflation, by the pull which he exerts on the cord 8, or, from any open position, he can re-close the valve by pulling on the cord 5. The provision of the two cords 5 and 8 gives him full control for both opening and closing the venting valve at any time, drawing the valve member to and fro across the outlet hole.

Other configurations for the outlet hole and the valve member are possible, for example a rectangular configuration for each could be selected with two closing cords attached to the two free corners of the valve member, or shapes with a larger number of sides than four could be utilized.

As the opening and closing movement of the valve member is in the direction substantially transversely of the outlet hole it is, likewise, substantially transverse to the direction of flow of escaping air. Accordingly the pilot does not have to overcome the resistance of this air flow to operate the valve, as in the case with, for example, a parachute valve. Furthermore, the arrangement of the cord 5 in relation to the valve member 4 is such that when this cord is pulled to close the valve the valve member 4, although moving substantially transversely of the outlet hole 2, is pulled to a certain extent in the downwards direction into the flow of escaping air which aids the movement of the valve member to its closed position. In addition, the double run of the cord 5 between the two pulleys 6 and 7 results in a mechanical advantage to the closing force, which could be enhanced by providing further pulleys, or the pulley 7 could be omitted.

Figure 4:
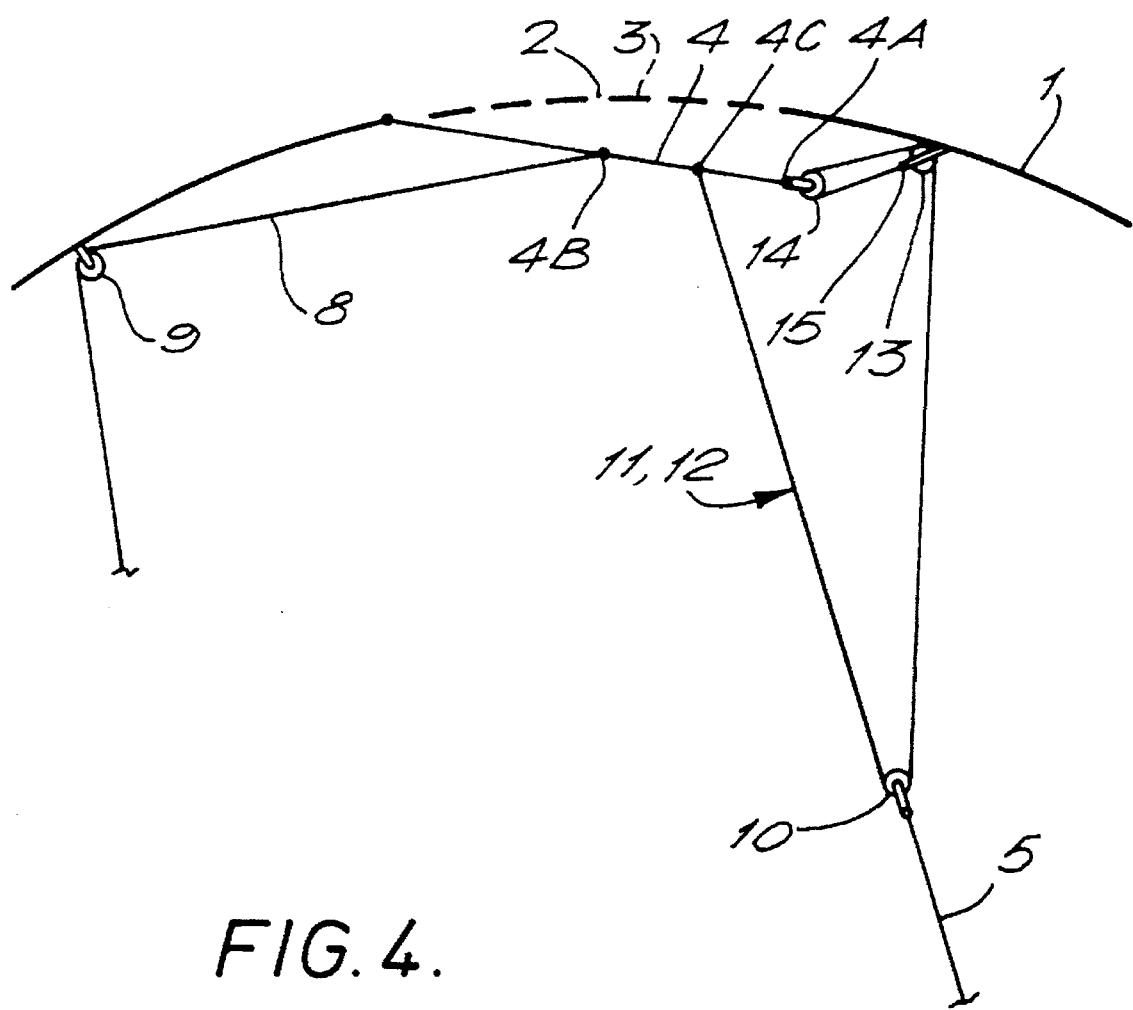
FIG. 4 is a schematic view as FIG. 2 of another form.

In the form of FIG. 4 the hole 2, tapes 3, valve member 4, second pilot-operable cord 8 and pulley 9 are as described with reference to FIGS. 2 and 3. In this form the first pilot-operable cord 5 runs from an attachment to a pulley 10 down for pilot operation. Two cords 11,12, thinner than the cords 5 and 8, that are attached to respective free edges of the valve member 4 at attachment points 4C that are between the free apex 4A of the valve member and the attachment point 4B of the second cord 8, come together at the pulley 10 and pass together around this pulley, around a pulley 13 attached to the balloon envelope 1, around a pulley 14 attached to the free apex 4A of the valve member and on to an anchorage 15 at the envelope 1. This anchorage 15 can be, for example, a becket.

Primary opening and closing of the valve member 4 in this form is achieved, substantially in the manner already described, by pulling on the cords 8 and 5 to cause the valve member to move substantially transversely of the outlet hole 2.

In addition, in this form, with the valve member 4 in the closed position (shown in FIG. 4) venting can be obtained without moving the valve member transversely of the outlet hole by pulling with some force on the first cord 5 to pull down the two cords 11,12 and hence to pull down the free side edges of the valve member at the cord attachment points 4C. Upon release of the cord 5 the valve member 4 re-closes under the action of the air in the balloon envelope 1.

I claim:

1. A venting valve in a hot air balloon comprising a valve member for opening and closing an outlet hole in the balloon envelope, the valve member being in the form of a flat panel having an edge portion secured along a line to a portion of the envelope adjacent an edge portion of the outlet hole, and a cord and pulley arrangement for drawing the valve member to and fro across the outlet hole, moving substantially transversely of the outlet hole, to close and open the outlet hole, wherein the cord and pulley arrangement includes a first cord attached to the valve member at an attachment point thereon remote from the secured edge portion thereof and running to a pulley attached to the balloon envelope and on for pilot operation and a second cord attached to the valve member at an attachment point thereon between the secured edge portion thereof and the attachment point thereon for the first cord and running to a further pulley attached to the balloon envelope and on for pilot operation.

2. A venting valve as claimed in claim 1, wherein the outlet hole is of a configuration with at least three sides and the valve member is of a larger configuration with at least three sides for overlapping the outlet hole, the valve member having a free apex and one of its side edges secured to the balloon envelope along one side of the outlet hole and the attachment point on the valve member for the first cord being at the free apex of the valve member.

3. A venting valve as claimed in claim 2, wherein the first cord runs back from its pulley attached to the balloon envelope to another pulley that is attached to the valve member between the free apex thereof and the attachment point thereon of the second cord.

4. A venting valve in a hot air balloon comprising a valve member for opening and closing an outlet hole in the balloon envelope, the valve member being in the form of a flat panel having an edge portion secured along a line to a portion of the envelope adjacent an edge portion of the outlet hole, and a cord and pulley arrangement for drawing the valve member to and fro across the outlet hole, moving substantially transversely of the outlet hole, to close and open the outlet hole, wherein the outlet hole is of a configuration with at least three sides and the valve member is of a configuration with at least three sides for overlapping the outlet hole, the valve member having a free apex and one of its side edges secured to the balloon envelope along one side of the outlet hole, and wherein the cord and pulley arrangement includes a first cord attached to the valve member at an attachment point thereon remote from the secured edge portion thereof and running to a pulley attached to the balloon envelope and on for pilot operation, further cords attached to respective free edges of the valve member and running via a pulley system to an anchorage at the balloon envelope, and a cord extending for pilot operation from an attachment to a pulley of the pulley system.

5. A venting valve as claimed in claim 4, wherein said further cords are attached to said respective free edges of the valve member at attachment points between the attachment point of said first cord and the free apex of the valve member.

6. A venting valve as claimed in claim 4, wherein the pulley system further comprises a pulley attached at the free apex of the valve member and a pulley attached to the balloon envelope.

* * * * *